UNITED STATES PATENT OFFICE.

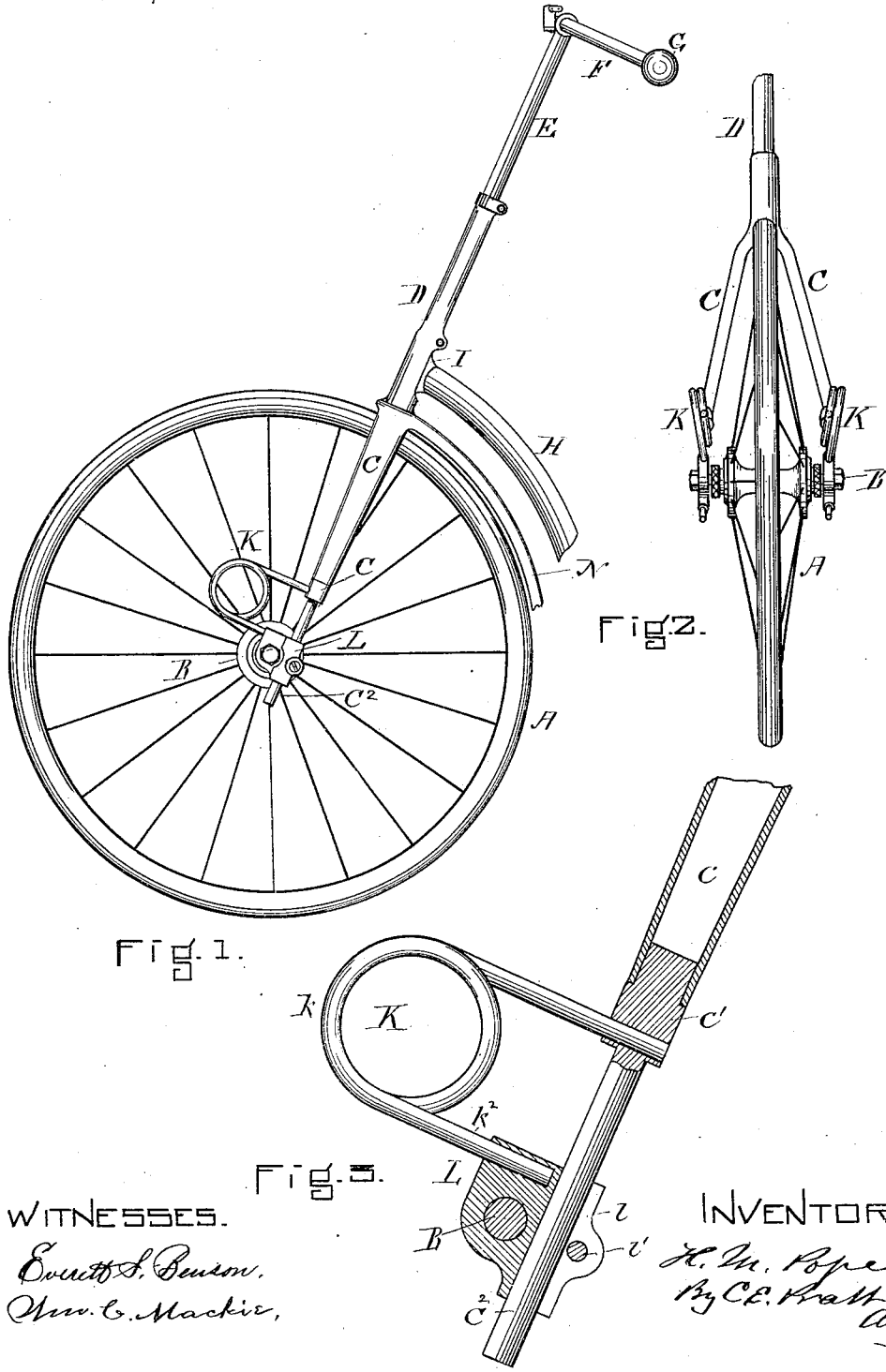

HARRY M. POPE, OF HARTFORD, CONNECTICUT, ASSIGNOR TO THE POPE MANUFACTURING COMPANY, OF PORTLAND, MAINE.

VELOCIPEDE.

SPECIFICATION forming part of Letters Patent No. 379,907, dated March 20, 1888.

Application filed March 4, 1887. Serial No. 229,671. (No model.)

*To all whom it may concern:*

Be it known that I, HARRY M. POPE, of the city of Hartford, in the county of Hartford and State of Connecticut, have invented certain new and useful Improvements in Velocipedes, of which the following is a specification.

My present improvements relate to the connection between the frame and fork of the steering-wheel of a tricycle and the axle of that wheel, and I shall show and describe them herein as applied in one form to this part of the velocipede mechanism; but they are equally applicable in bicycles or safeties or other kinds of velocipedes, and with respect to other patents of these machines. The small wheels of velocipedes are subject to constant and considerable jar from obstacles in the road and from the unevenness of the surface, and with any rigid connection between the small wheels and the frame this jar is communicated, so as to be annoying and disadvantageous to the rider, as felt through either the pedals, the handles, or the seat. Several expedients have heretofore been resorted to in the endeavor to overcome the objections of a rigid or unyielding connection between the fork or frame and the wheel; but none of them have been satisfactory in other respects, whatever approximate accomplishment of their purpose they may have performed. In the case of the steering-wheel of a tricycle it is obvious that the connection between the handles and fork and the wheel must be practically rigid as to their lateral operation, and that elasticity in the direction substantially perpendicular to the obstructions met must be confined within a narrow limit, and must be so provided for as not to detract from the substantial certainty of operation and endurance of the machine.

It is the object of my improvement to attain results in accordance with these principles; and the method in which I attain it will be apparent from the following description, taken in connection with the accompanying drawings, in which—

Figure 1 shows in side elevation the steering-wheel of a front-steering tricycle, with its steering-fork, head, and handles, and part of the frame embodying my improvement in one form. Fig. 2 shows in end elevation most of the same parts; and Fig. 3 shows, partly in section and partly in side elevation and somewhat enlarged, parts of the device which particularly show my improvement in detail.

A is a wheel. B is its axle. C is a fork. D is a steering-head. E is a handle-rod. F is a handle-bar. G is a handle. H is a reach or portion of the frame. I is the neck, having a spindle and centers in the steering-head D. N is a mud-guard. All of these may be constructed substantially as shown, or in any other approved manner, according to the art of constructing velocipedes or the necessities of the particular machine made.

The fork-arms C, as I make them, are hollow or tubular, as shown in Fig. 3, though they may be made solid or in any other approved manner. The wheel A is a loose wheel—that is, it is free to turn on its axle B—and the axle B is connected rigidly with the frame, so as not to revolve, as I prefer to make it; but it is obvious that my improvements may be applied, with slight modification, to a case in which the wheel is fixed on its axle and the axle revolves with it. I attach to each of the ends of the tubular fork C a forging, C', constructed with a cylindrical extension or guide-rod, C², and with a seat to receive one end, $k'$, of a spring.

On either side of the wheel and to the axle B, I secure a bracket, L, which is constructed not only for securement to the axle, but also with a cylindrical parallel-sided mortise to receive the guide-rod C², and with a seat to receive one end, $k^2$, of a spring. This bracket L may be slit, as at $l$, so as to present a split lug to receive a screw or bolt, $l'$, by means of which the mortise for the guide-rod may be adjusted to a closer or looser fit, and thus be adjustable for wear by use between the mortise and the guide-rod, which have a free or slight bearing on each other. The spring K I prefer to construct, as shown, of properly-tempered steel rod coiled into one or more convolutions, as $k$, and having the parallel arms $k'$ $k^2$ for attachment, one to the guide-rod and one to the bracket, and I prefer to make this spring sufficiently rigid, or with only such elasticity as will sustain the normal weight resting upon it, and will only yield within comparatively narrow limits to the jar of the uneven road and the effect of meeting obstacles thereon. To allow for this elasticity, I shall leave a little more space between the arch of the two fork-arms C C over the wheel and the wheel than is usual with the ordinary rigid construction, although this space is not necessarily more than half an inch, if the parts be properly constructed.

It is obvious that modifications may be made in the form and arrangement of the different parts of this mechanism described without departing from the substance of my invention, as by making a different form of spring, or a rectangular guide-rod instead of cylindrical, or an axle bearing between the axle B and the bracket L, in case of a wheel with a fixed axle, or by making the tenon C upon a part of a solid fork-arm, instead of a separate forging inserted and brazed to a tube, as well as other modifications which may be obvious.

I claim as new and of my invention—

Combined with the fork-arms, as C C, and axle, as B, of a velocipede, two brackets, as L L, one at each end of the axle, and each having a socket for a guide-rod, two springs, as K K, each having one end secured to a bracket and the other end secured to a fork-arm, and two guide-arms, as $C^2 C^2$, each secured at one end to the fork-arm and held with a free play at the other end in a socket in the bracket.

HARRY M. POPE.

Witnesses:
F. E. BELDEN,
D. J. POST.